United States Patent

O'Connor et al.

[15] 3,652,942
[45] Mar. 28, 1972

[54] FEEDBACK CONTROL SYSTEM

[72] Inventors: Ward F. O'Connor, Deanville, N.J.; William George Van Vliet, Greenwich, Conn.

[73] Assignee: The Lummus Company, Bloomfield, N.J.

[22] Filed: Jan. 18, 1971

[21] Appl. No.: 107,029

[52] U.S. Cl............................................328/127, 330/1, 328/1
[51] Int. Cl. ................................................................G06g 7/18
[58] Field of Search......................330/1 A; 328/127, 1, 132

[56] References Cited

UNITED STATES PATENTS

| 2,946,943 | 7/1960 | Nye et al.................................328/127 |
| 2,957,980 | 10/1960 | Steghart et al..........................328/127 |
| 3,377,548 | 4/1968 | Newbold..................................330/1 A |
| 3,197,711 | 7/1965 | Richardson.............................330/1 A |

Primary Examiner—Donald D. Forrer
Assistant Examiner—Harold A. Dixon
Attorney—Marn & Jangarathis

[57] ABSTRACT

A feedback control system including differentiating means and integrating means is disclosed in accordance with the teachings of the present invention wherein the effective time constants of the differentiating means and the integrating means are simultaneously modified in accordance with a single adjusting means such that said time constants maintain a constant relationship with respect to each other. The single adjusting means includes variable proportioning means for producing a signal proportional to an input signal such that the ratio of proportionality between the produced signal and the input signal is adapted to be altered, and reciprocal means supplied with said input signal such that said relationship is equal to the reciprocal of said ratio of proportionality. The produced signal and the generated signal are applied to the differentiating means and the integrating means whereby the effective time constants thereof are modified in accordance with said ratio of proportionality. The sensitivity of the feedback control system may be modified by second adjusting means.

21 Claims, 4 Drawing Figures

FEEDBACK CONTROL SYSTEM

This invention relates to automatic feedback control systems and more particularly, to apparatus for adjusting the operating characteristics of an automatic feedback control system to provide an optimum control function.

Feedback control systems are advantageously utilized to accurately control the operation of a device. The device may appropriate several conventional forms such as a signal amplifier, a phase-shift system, an electric motor, a chemical processing plant and various other well-known devices adapted to have the operation thereof adjusted for external and internal disturbances and device load variations. Prior art automatic feedback control systems include means for detecting the actual operation of the device, means for comparing the actual operation of said device with a predetermined standard of performance and means for adjusting a manipulatable variable in accordance with said comparison to affect the operation of said device. Simplified feedback control systems have only a single mode of operation commonly referred to as the proportional mode. The proportional mode of operation adjusts the performance of the device in a manner proportional to the value of the deviation between the actual operation and a desired operation thereof. More efficient feedback control systems additionally include a reset or integral mode of operation. The reset mode continuously amplifies the aforementioned deviation with the passage of time until the deviation is reduced to zero. However, the reset mode of operation exhibits frequency dependent characteristics which introduce time delays in the feedback control loop, thereby causing the actual operation of the device to oscillate about the predetermined standard of performance. This instability of the reset mode may be compensated by further including a rate mode of operation in the feedback control system. The rate mode controls the performance of the device in accordance with the rate of change of the aforementioned deviation between actual operation and desired operation. Accordingly, the rate mode of operation is effective to predict the future operation of the device.

A conventional electrical configuration of a feedback control system comprises a parallel combination of amplifier, integrator and differentiator to provide the proportional mode, reset mode and rate mode of operation, respectively. A desirable feature of an electrical feedback control system is the capability thereof to control the operation of a variety of devices. It should be noted, however, that although the electrical feedback control system admits of diverse applicability, the operating characteristics thereof must be uniquely adjusted for each application to provide optimum control of the individual device. Hence the gain of the amplifier and the respective time constants of the integrator and the differentiator must admit of modification.

The aforementioned operating characteristics of the feedback control system have heretofore been individually adjusted, thereby requiring a technician to expend considerable time and effort in an attempt to match the characteristics of the feedback control system to the characteristics of the controlled device. It has been discovered, however, that each of the time constants of the integrator and the differentiator should in general correspond to the inherent time constants of the device. The time constants of a device relate to the length of time required for the device to respond to a change in the manipulatable variable. For example, if the time constant of the integrator is too small with respect to the time constant of the device, the component of the control signal attributable to the integrator increases very rapidly with the passage of time, and is excessive, causing unstable operation of the device. Similarly, if the time constant of the differentiator is too small with respect to the time constant of the device, the predictive function of the rate mode of operation tends to under-anticipate the future operation of the device and does not correspond to the actual operation thereof. In an analogous manner, if the relative time constant of the integrator is too high, the component of the control signal attributable to the reset mode is ineffective to precipitate stabilized operation of the device. Likewise, if the relative time constant of the differentiator is too large, the predictive function thereof tends to over-anticipate the future operation of the device, causing unstable operation. Consequently, it is desirable to maintain a constant relationship between the time constants of the integrator and the differentiator when adjusting the characteristics of the feedback control system to obtain optimum control of a device.

Therefore, it is an object of the present invention to provide a feedback control system exhibiting adjustable characteristics for regulating the operation of a device.

It is another object of the present invention to provide a feedback control system admitting of operating characteristics which may be rapidly and facilely adjusted to match the operating characteristics of a device.

It is a further object of the present invention to provide singular adjustable means for simultaneously modifying the effective time constants of integrating means and differentiating means.

It is an additional object of this invention to provide apparatus for maintaining a constant relationship between the variable time constants of integrating means and differentiating means, respectively.

It is yet another object of the present invention to provide apparatus including only two adjustable means for modifying the operating characteristics of a feedback control system employing three modes of operation to precisely match the operating characteristics of a controlled device.

Various other objects and advantages of the invention will become clear from the following detailed description of exemplary embodiments thereof and the novel features will be particularly pointed out in connection with the appended claims.

In accordance with the present invention, a feedback control system including proportional mode operating means, reset mode operating means and rate mode operating means is provided wherein first adjustable means coupled to the proportional mode operating means is adapted to modify the proportionality function of said proportional mode operating means in accordance with a modification of the first adjustable means; and second adjustable means coupled to the reset mode operating means and rate mode operating means, respectively, is adapted to simultaneously modify the time constants of said reset mode operating means and said rate mode operating means in accordance with a modification of the second adjustable means whereby said respective time constants maintain a constant relationship with respect to each other notwithstanding the modification of the second adjustable means.

The invention will be more clearly understood by reference to the following detailed description of exemplary embodiments thereof in conjunction with the accompanying drawings in which.

Figure 1:
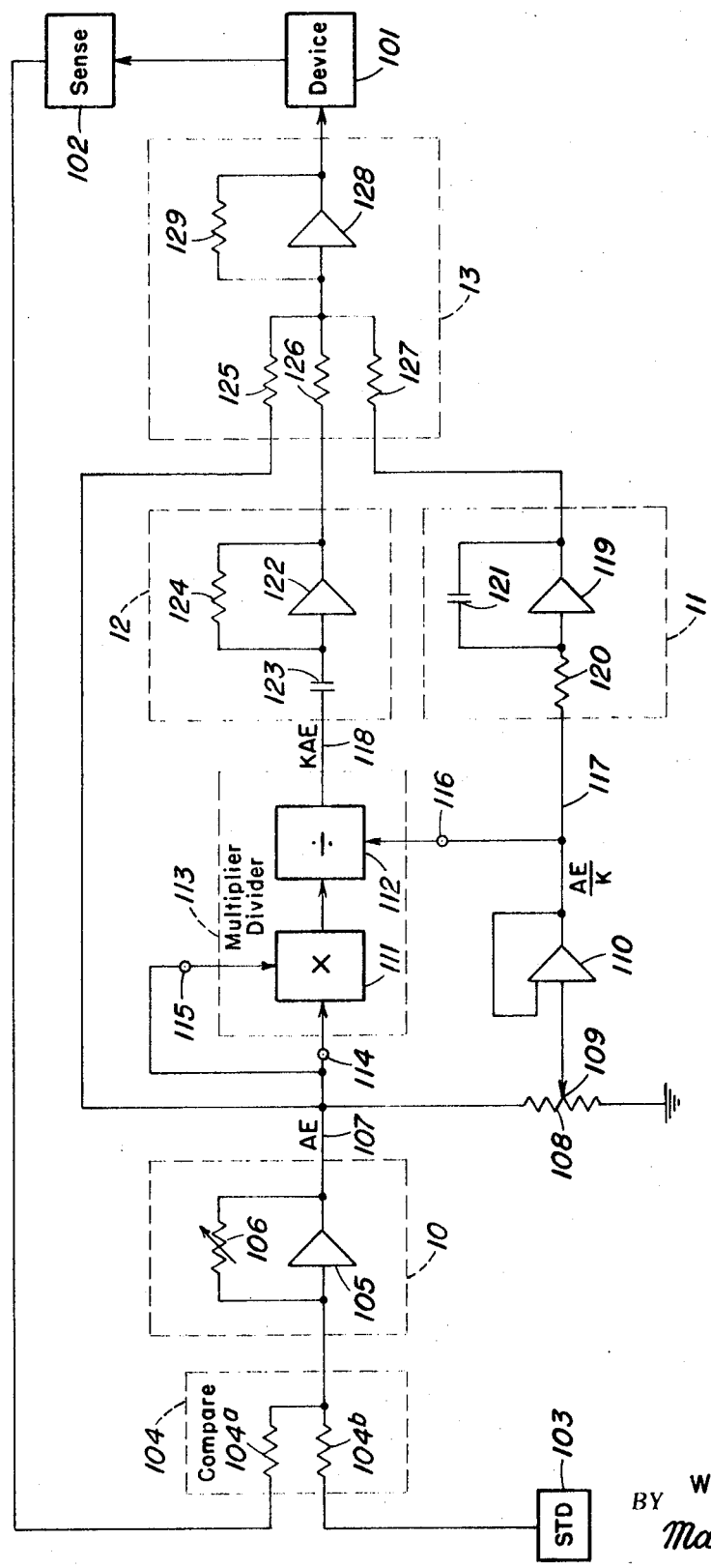
FIG. 1 illustrates in schematic and block form the apparatus of the present invention.

Referring now to the drawings wherein like reference numerals are used throughout, and in particular to FIG. 1, there is illustrated an embodiment of the apparatus that may be utilized in accordance with the present invention, comprising, operating device 101, compare means 104, proportional mode operating means 10, adjustable resistance means 108, multiplying means 111, dividing means 112, reset mode operating means 11, rate mode operating means 12, and combining means 13. Device 101 may be an electrical device, a mechanical device, an electro-mechanical device, or a fluidic device adapted to vary its operation in accordance with a control signal applied thereto. Illustrative devices may include an electrical amplifier, a speed controlled motor, a pressure or temperature controlled processing system, a mechanical balancing device or the like. Each of the foregoing devices are characterized by modifiable operation dependent upon a manipulatable variable. Operating device 101 is coupled to sensing means 102 which is adapted to sense the actual operation of device 101. Sensing means 102 may comprise a conventional transducer such as a strain gauge, a tachometer, a thermocouple, or the like for producing an electrical signal representative of the operation of device 101.

Sense means 102 is coupled to compare means 104 which is adapted to detect deviations between the actual operation of device 101 and a desired standard of performance therefor. Accordingly, an electrical manifestation of said desired standard of performance is provided by reference means 103 which is coupled to compare means 104. The manifestation provided by reference 103 is commonly referred to as a set point. Compare means 104 may include resistance means 104a and 104b, coupled to a common junction whereat an error signal may be produced. Alternatively, compare means 104 may comprise a conventional differential amplifier including a first input terminal connected to sense means 102 and a second input terminal connected to reference means 103 and adapted to produce an error signal proportional to the difference between the signals applied to said first and second input terminals. Compare means 104 is coupled to proportional mode operating means 10 which is capable of providing an output signal on lead 107 that is proportional to the generated error signal applied thereto. Proportional mode operating means 10 may comprise a conventional amplifying means such as operational amplifying means 105 and variable feedback resistance means 106. It is understood by those skilled in the art that the gain of amplifying means 105 is dependent upon the effective resistance of variable feedback resistance means 106. Hence, variable feedback resistance means 106 may comprise rheostat means, potentiometer means, a thermistor, photoresistor means, or the like. Alternatively, proportional mode operating means 10 may comprise amplifying means having an amplification factor dependent upon the biasing thereof.

Electrical lead 107 is effective to couple proportional mode operating means to adjustable resistance means 108 which may comprise a conventional potentiometer having an adjustable contact 109. In addition, electrical lead 107 couples the proportional mode operating means 10 to the common connected input terminals 114 and 115, respectively, of multiplying means 111. Multiplying means 111 may comprise a conventional multiplying circuit adapted to produce a signal equal to the product of the signals applied to the input terminals 114 and 115, respectively. Accordingly, for the purpose of explanation, multiplying means 111 may comprise a conventional squaring circuit for providing a signal proportional to the square of a signal supplied thereto. Multiplying means 111 is coupled to a dividing means 112 which includes input terminal 116. Input terminal 116 is coupled to adjustable contact 109 by a conventional voltage follower circuit 110. The dividing means 112 is capable of producing a signal proportional to the quotient of the signal supplied thereto by multiplying means 111, divided by the signal applied to input terminal 116. If desired, multiplying means 111 and dividing means 112 may be included in a unitary multiplier-divider circuit 113, such as the model 19–302 multiplier-divider module commercially available from the Controls Division of the Bell and Howell Corporation. Consequently, the multiplier-divider circuit 113 is adapted to generate a signal proportional to the product of the signals applied to input terminals 114 and 115 divided by the signal applied to input terminal 116.

Lead 117 couples voltage follower 110 to the reset mode operating means 11 and lead 118 couples dividing means 112 to the rate mode operating means 12. Reset mode operating means 11 may comprise a conventional integrating circuit including operation amplifying means 119, input resistance means 120 coupled to said operational amplifying means 119 and feedback capacitance means 121 interconnecting the output of operational amplifying means 119 with the input thereof. Similarly, the rate mode operating means 12 may comprise a conventional differentiating circuit including operational amplifying means 122, input capacitance means 123 coupled to said operational amplifying means 122 and feedback resistance means 124 interconnecting the output of operational amplifying means 122 with the input thereof. As is understood by those skilled in the art, reset mode operating means 11 is adapted to produce a signal proportional to the integral of the signal supplied thereto by lead 117. Further, rate mode operating means 12 is adapted to produce a signal proportional to the rate of change of the signal supplied thereto by lead 118.

Each of proportional mode operating means 10, reset mode operating means 11, and rate mode operating means 12 is coupled to combining means 13. The combining means 13 is adapted to produce a control signal containing components attributable to each of said respective operating means. Consequently, combining means 13 may comprise conventional algebraic adding means such as a summing amplifier comprised of operational amplifying means 128, input resistance means 125, 126 and 127, and feedback resistance means 129. Input resistance means 125 couples proportional mode operating means 10 to operational amplifying means 128. Similarly, input resistance means 126 couples rate mode operating means 12 to operational amplifying means 128, and input resistance means 127 couples reset mode operational means 11 to operational amplifying means 128. Combining means 13 is coupled to the operating device 101 whereby the control signal generated by said combining means may be utilized to modify the operation of device 101. Accordingly, combining means 13 may be coupled to a conventional final control element such that a manipulatable variable is regulated by said final control element in accordance with the control signal supplied thereto.

The operation of the apparatus illustrated in FIG. 1 will now be described. Sense means 102 senses the actual operation of device 101 and supplies compare means 104 with a signal indicative of said actual operation. Compare means 104 is additionally supplied with a reference signal provided by reference means 103 representative of a desired standard of performance. Accordingly, compare means 104 operates in a well-known manner to supply proportional mode operating means 10 with an error signal representing a deviation between the actual operation and a desired operation of said device 101. Proportional mode operating means 10 amplifies the generated error signal. If the resistance of resistance means 104a is equal to the resistance of resistance means 104b, it is seen that the gain of the proportional mode operating means 10 is determined by the effective resistance of adjustable feedback resistance means 106. Lead 107 supplies the amplified error signal to potentiometer means 108. It is readily apparent that potentiometer means 108 comprises a variable voltage divider for dividing the amplified error signal by a factor determined by the relative position of adjustable contact 109. Therefore, if E represents the error signal produced by compare means 104, A represents the gain of proportional mode operating means 10 determined by the adjustable feedback resistance means 106 thereof, and K represents the divisor determined by the relative position of adjustable contact 109, then the signal supplied by voltage follower means 110 may be expressed as the fraction AE/K. It is here noted that voltage follower means 110 effectively isolates potentiometer means 108 from deleterious effects produced by the elements of the apparatus of FIG. 1, and if desired, may be omitted.

The amplified error signal produced by proportional mode operating means 10 is additionally applied by lead 107 to multiplying means 111. Accordingly, the signal produced by multiplying means 111 may be expressed by $A^2E^2$. This latter signal is divided in dividing means 112 by the signal supplied to input terminal 116. Consequently, the signal produced by dividing means 112 and applied to lead 118 may be expressed as KAE.

Reset mode operating means 11 functions in the well-known manner to produce an output signal proportional to the integral of the signal supplied thereto. Accordingly, reset mode operating means 11 responds to the signal applied thereto by lead 117 to produce an output signal that may be expressed as $$\frac{A}{KT_{re}} \int E dt,$$

where $T_{re}$ represent the inherent time constant of the reset mode operating means 11. As is understood, this time constant is equal to the product of the resistance of resistance means 120 and the capacitance of capacitance means 121. Accordingly, $T_{re}$ is determined by fixed physical quantities. However, it is readly apparent that the effective time constant of reset mode operating means 11 is equal to $KT_{re}$.

Rate mode operating means 12 function in the well-known manner to produce an output signal proportional to the derivative of an input signal supplied thereto. Hence, the signal produced by rate mode operating means 12 may be expressed as $AKT_{ra} dE/dt$, where $T_{ra}$ represents the inherent time constant of the rate mode operating means 12 and is equal to the product of the resistance of resistance means 124 and the capacitance of capacitance means 123. Hence, $T_{ra}$ is determined by fixed physical quantities. However, it is readily apparent that the effective time constant of rate mode operating means 12 is equal to $KT_{ra}$. The signals produced by each of the aforementioned operating means are supplied to combining means 13. If the resistance of each of resistance means 125, 126, 127 and 129 are equal, then combining means 13 functions to algebraically add the signals supplied thereto. Consequently, combining means 13 generates a control signal that may be expressed as $$AE + \frac{A}{KT_{re}} \int E dt + AKT_{ra}\frac{dE}{dt}$$

This expression may be rewritten as $$A\left[ E + \frac{1}{KT_{re}} \int E dt + KT_{ra}\frac{dE}{dt} \right].$$

It is now apparent that the sensitivity of the feedback control system of the present invention is determined by the factor A. Hence, the sensitivity may be adjusted for particular applications of the present invention merely by varying the gain of proportional mode operating means 10, such as by modifying the adjustable resistance means 106, until the desired result obtains. In addition, the effective time constants of the rate mode operating means 12 and the reset mode operating means 11 may be modified merely by adjusting potentiometer means 108.

One skilled in the art may now observe that the relationship between said time constants maintains a constant value notwithstanding the modifications thereof. Hence, the ration between the effective time constant of the reset mode operating means, which is expressed as $KT_{re}$ and the effective time constant of the rate mode operating means which is expressed as $KT_{ra}$ is equal to the fraction $T_{re}/T_{ra}$. Therefore, the effective time constants of the feedback control system of the present invention may be accurately matched to the inherent time constant of the operating device 101 merely by adjusting potentiometer means 108 until a desired value obtains.

A modification of the present invention obtains if the proportional mode operating means comprised of operational amplifying means 105 and adjustable feedback resistance means 106 is omitted such that lead 107 directly connects compare means 104 with potentiometer means 108. The sensitivity factor A may be adjusted by correspondingly adjusting the resistance of resistance means 129. Thus, it is seen that the present invention provides only two adjustable parameters for modifying the operating characteristics of a feedback control system employing three modes of operation to obtain an optimum control signal.

Figure 2:
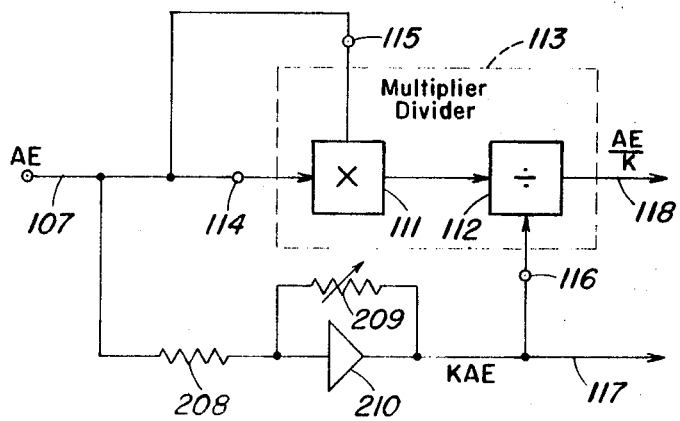
FIG. 2 illustrates in schematic and block form a modification of the apparatus of the present invention.

Referring now to FIG. 2 there is shown another embodiment which may be utilized with the present invention. The voltage dividing circuit comprised of potentiometer means 108 connected to lead 107 of FIG. 1 may be replaced with the variable gain amplifying means comprised of resistance means 208 and 209, and amplifying means 210 as is illustrated in FIG. 2. Resistance means 208 couples amplifying means 210 to lead 107. Amplifying means 210 may comprise an operational amplifying means similar to aforedescribed operational amplifying means 105. Resistance means 209 comprises an adjustable feedback resistance means interconnecting the output of operational amplifying means 210 with the input thereof. The output of operational amplifying means 210 is coupled to input terminal 116 of aforedescribed dividing means 112 and to lead 117. It is recognized that the gain of the variable gain amplifying means of FIG. 2 is dependent upon the effective resistance of adjustable feedback resistance means 209. Accordingly, the signal applied to input terminal 116 and to lead 117 may be expressed as KAE where K is the gain of the variable gain amplifying means as determined by the resistance of adjustable feedback resistance means 209. Consequently, the signal applied to lead 118 by dividing means 112 is equal to $(A^2E^2)/(KAE)$ or $AE/K$. Hence, the signal produced by reset mode operating means 11 may be expressed as $$\frac{KA}{T_{re}} \int E dt$$

and similarly, the signal produced by rate mode operating means 12 may be expressed as $$\frac{AT_{ra}}{K}\frac{dE}{dt}.$$

Thus, it is seen that the effective time constant of reset mode operating means 11 is now equal to $T_{re}/K$, and the effective time constant of rate mode operating means 12 is equal to $T_{ra}/K$. The relationship between the effective time constants has been maintained notwithstanding the modification thereof.

Figure 3:
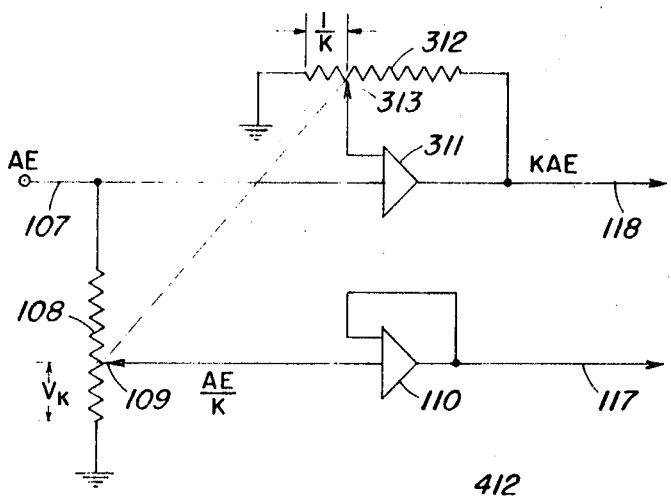
FIG. 3 is a schematic representation of another embodiment of the present invention.

FIG. 3 illustrates yet another embodiment that may be utilized with the present invention wherein multiplying means 111 and dividing means 112 of FIG. 1 have been replaced with amplifying means 311 and adjustable resistance means 312. Amplifying means 311 may comprise operational amplifying means similar to aforedescribed operational amplifying means 105 and is coupled at an input thereof to lead 107. Adjustable resistance means 312 may comprise potentiometer means including an adjustable contact 313 whereby the potentiometer means serves as an adjustable feedback resistance means. One skilled in the art will recognize that the gain of operational amplifying means 311 is determined by the relative position of adjustable contact 313. Accordingly, said gain is equal to the value of the entire resistance of resistance means 312, divided by the value of the resistance of that portion of resistance means 312 extending to the left of adjustable contact 313. Consequently, if adjustable contact 313 is mechanically coupled to adjustable contact 109 such that adjustable contact 313 is positioned along resistance means 312 in a manner corresponding to the position of adjustable contact 109 along resistance means 108, then operational amplifying means 311 provides lead 118 with a signal that may be expressed as KAE as is apparent to one skilled in the art. It is observed that leads 117 and 118 in FIG. 3 are supplied with signals identical to signals applied thereto in FIG. 1.

Figure 4:
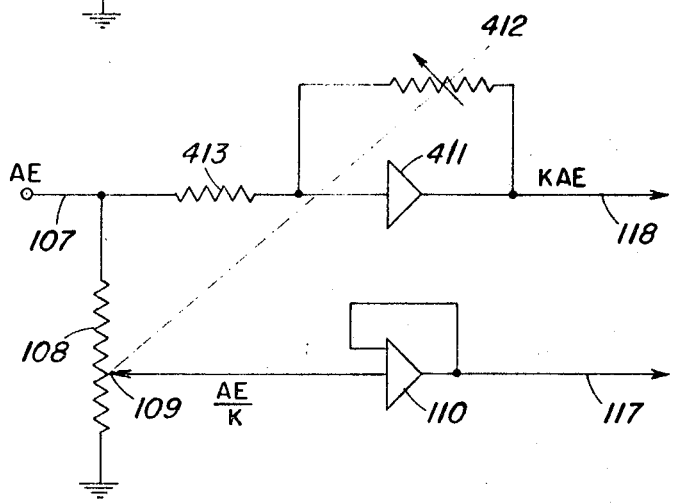
FIG. 4 represents a further embodiment of the present invention.

Still another embodiment that may be utilized in the present invention is illustrated in FIG. 4 wherein the variable gain amplifying means comprised of operational amplifying means 311 and adjustable resistance means 312, heretofore described with respect to FIG. 3, is replaced with a variable gain amplifying means comprised of operational amplifying means 411, adjustable feedback resistance means 412 and input resistance means 413. It is clear that the gain of the variable gain amplifying means of FIG. 4 is dependent upon the effective resistance of adjustable feedback resistance means 412. Accordingly, adjustable feedback resistance means 412 may be mechanically coupled to potentiometer means 108 such as, for example, ganged rotary resistors, whereby corresponding modifications of resistance means 412 and resistance means 108 may be accomplished by a single adjustment. It is recognized that, if desired, feedback resistance means 412 may remain fixed and input resistance means 413 may comprise an adjustable resistance means mechanically coupled to potentiometer means 108. Thus, the signals provided at leads 117 and 118 of FIG. 4 are equal to the corresponding signals of FIG. 1. It should be noted that in each of the embodiments of the present invention, leads 117 and 118 may alternatively be coupled to rate mode operating means 12 and reset mode operating means 11, respectively, if desired. In addition, proportional mode operating means 10 may comprise adjustable attenuating means.

While the invention has been particularly shown and described with reference to specific embodiments thereof, it will be obvious to those skilled in the art that the foregoing and various other changes and modifications in form and details may be made without departing from the spirit and scope of the invention. It is therefore intended that the appended claims be interpreted as including all such changes and modifications.

What is claimed is:

1. A feedback control system for regulating the operation of a device in accordance with a desired standard of performance, comprising:
   error detecting means for providing an error signal when said operation differs from said desired standard of performance;
   proportional mode operating means for providing a first signal proportional to said error signal;
   reset mode operating means for producing a second signal proportional to the integral of said error signal;
   rate mode operating means for producing a third signal proportional to the rate of change of said error signal;
   combining means coupled to each of said proportional mode operating means, said reset mode operating means and said rate mode operating means to combine said first, second and third signals to generate a control signal adapted to be applied to said device whereby the operation of said device tends to conform to said desired standard of performance thereby minimizing said error signal;
   first adjustable means coupled to said proportional mode operating means and adapted to modify the ratio of proportionality between said first signal and said error signal in accordance with a modification of said first adjustable means; and
   second adjustable means coupled to said reset mode operating means and said rate mode operating means and adapted to simultaneously modify the respective time constants of said reset mode operating means and said rate mode operating means in accordance with a modification of said second adjustable means whereby said respective time constants maintain a constant relationship with respect to each other notwithstanding said modification of said second adjustable means.

2. A feedback control system in accordance with claim 1 wherein said first adjustable means comprises variable resistance means such that the proportional gain of said proportional mode operating means is varied in accordance with a variation in said resistance means.

3. A feedback control system in accordance with claim 1 wherein said second adjustable means comprises:
   first means including an input terminal coupled to said error detecting means and an output terminal, for providing at said output terminal thereof a signal related to the signal applied to said input terminal thereof, such that the ratio of the output signal to the input signal is equal to an adjustable value; and
   second means including an input terminal coupled to said input terminal of said first means and an output terminal, for providing at the output terminal thereof a signal related to the signal applied to the input terminal thereof such that the ratio of the output signal to the input signal is equal to the reciprocal of said adjustable value whereby the output terminals of said first and second means are adapted to be coupled to said reset mode operating means and said rate mode operating means.

4. A feedback control system in accordance with claim 3 wherein said first means comprises potentiometer means having an adjustable contact whereby the signal provided by said adjustable contact is a fraction of the signal supplied to said potentiometer means, said fraction being determined by the relative position of said adjustable contact.

5. A feedback control system in accordance with claim 3 wherein said first means comprises variable gain amplifying means including adjustable feedback resistor means whereby the gain of said variable gain amplifying means is determined by the effective resistance of said adjustable feedback resistor means.

6. A feedback control system in accordance with claim 3 wherein said second means comprises:
   multiplying means including first and second input terminals connected in common to the input terminal of said first means, for producing a signal equal to the product of the signals applied to said first and second input terminals; and
   dividing means coupled to said multiplying means and including a first input terminal connected to the output terminal of said first means and an output terminal, for producing at the output terminal thereof a signal equal to the quotient of the signal produced by said multiplying means divided by the signal provided by said first means.

7. A feedback control system in accordance with claim 4 wherein said second means comprises variable gain amplifying means including adjustable feedback resistor means whereby the gain of said variable gain amplifying means is determined by the effective resistance of said adjustable feedback resistor means, said adjustable feedback resistor means being mechanically coupled to and operably adjustable with said adjustable contact of said potentiometer means.

8. In combination with a feedback control system for regulating the operation of a device, said feedback control system including differentiating means and integrating means responsive to an error signal characterizing the operation of said device, adjustable means for modifying the time constants of said differentiating means and said integrating means, comprising:
   variable proportioning means supplied with said error signal for producing a signal proportional to said error signal such that the ratio of proportionality between said produced signal and said error signal is adapted to be varied;
   reciprocal means supplied with said error signal for generating a signal related to said error signal, said relationship being equal to the reciprocal of said ratio of proportionality; and
   means for applying said produced signal and said generated signal to said differentiating means and said integrating means whereby the effective time constants of said differentiating means and said integrating means are modified in accordance with said ratio of proportionality.

9. The combination of claim 8 wherein said variable proportioning means comprises variable gain amplifying means including adjustable resistance means whereby the gain of said variable gain amplifying means is determined by the effective resistance of said adjustable resistance means such that said gain is equal to said ratio of proportionality.

10. The combination of claim 9 wherein said reciprocal means comprises:
   first means for providing a signal proportional to the square of said error signal; and second means coupled to said variable gain amplifying means and responsive to said first means for generating a signal proportional to the quotient of said provided signal divided by said produced signal.

11. The combination of claim 8 wherein said variable proportioning means comprises potentiometer means having an adjustable contact such that said ratio of proportionality is determined by the relative position of said adjustable contact.

12. The combination of claim 11 wherein said reciprocal means comprises:
first means for providing a signal proportional to the square of said error signal; and
second means coupled to said adjustable contact and responsive to said first means for generating a signal proportional to the quotient of said provided signal is divided by said produced signal.

13. The combination of claim 11 wherein said reciprocal means comprises variable gain amplifying means including adjustable resistance means whereby the gain of said variable gain amplifying means is determined by the effective resistance of said adjustable resistance means, said adjustable resistance means being mechanically coupled to and operably adjustable with said adjustable contact of said potentiometer means.

14. Apparatus for controlling the operation of a device, comprising:
sensing means for sensing the actual operation of said device;
compare means coupled to said sensing means for comparing the actual operation of said device with a desired standard of performance and generating an error signal indicative of a deviation therebetween;
variable gain amplifying means coupled to said compare means for amplifying said error signal;
adjustable means including an input terminal coupled to said variable gain amplifying means and an output terminal, for producing at the output terminal thereof an output signal related to said amplified error signal by an adjustable proportionality ratio;
reciprocal means including an input terminal coupled to said variable gain amplifying means and an output terminal, for generating at the output terminal thereof an output signal related to said amplified error signal by the reciprocal of said proportionality ratio;
integrating means coupled to said output terminal of said adjustable means for producing a signal proportional to the integral of said error signal, such that the effective time constant of said integrating means is modified in accordance with said proportionality ratio;
differentiating means coupled to said output terminal of said reciprocal means for producing a signal proportional to the rate of change of said error signal, such that the effective time constant of said differentiating means is modified in accordance with said proportionality ratio whereby said effective time constant of said integrating means and said effective time constant of said differentiating means admit of a constant relationship with respect to each other;
combining means coupled to said variable gain amplifying means, said integrating means and said differentiating means for producing a control signal; and
means for applying said control signal to said device so that the actual operation of said device tends to conform to said desired standard of performance whereby said error signal is reduced to zero.

15. The apparatus of claim 14 wherein said adjustable means comprises another variable gain amplifying means including adjustable resistance means whereby the gain of said other variable gain amplifying means is determined by the effective resistance of said adjustable resistance means such that said gain is equal to said adjustable proportionality ratio.

16. The apparatus of claim 15 wherein said reciprocal means comprises:
first means for providing a signal proportional to the square of said amplified error signal; and
second means coupled to said other variable gain amplifying means and responsive to said first means for generating a signal proportional to the quotient of said provided signal divided by the output of said other variable gain amplifying means.

17. The apparatus of claim 15 wherein said reciprocal means comprises multiplier-divider means including a first input terminal connected to said variable gain amplifying means, a second input terminal connected in common relationship with said first input terminal to said variable gain amplifying means, a third input terminal connected to said other variable gain amplifying means and an output terminal, for generating a signal proportional to the product of the signals applied to the first and second input terminals thereof divided by the signal applied to the third input terminal thereof.

18. The apparatus of claim 14 wherein said adjustable means comprises potentiometer means having an adjustable contact such that said proportionality ratio is determined by the relative position of said adjustable contact.

19. The apparatus of claim 18 wherein said reciprocal means comprises:
first means for providing a signal proportional to the square of said amplified error signal; and
second means coupled to said adjustable contact and responsive to said first means for generating a signal proportional to the quotient of said provided signal divided by the signal applied thereto by said adjustable contact.

20. The apparatus of claim 18 wherein said reciprocal means comprises multiplier-divider means including a first input terminal connected to said variable gain amplifying means, a second input terminal connected in common relationship with said first input terminal to said variable gain amplifying means, a third input terminal connected to said adjustable contact and an output terminal, for generating a signal proportional to the product of the signals applied to the first and second input terminals thereof divided by the signal applied to the third input terminal thereof.

21. The combination of claim 18 wherein said reciprocal means comprises additional variable gain amplifying means including adjustable resistance means whereby the gain of said additional variable gain amplifying means is determined by the effective resistance of said adjustable resistance means, said adjustable resistance means being mechanically coupled to and operably adjustable with said adjustable contact of said potentiometer means.

* * * * *